(12) United States Patent
Sinha et al.

(10) Patent No.: US 8,719,115 B2
(45) Date of Patent: *May 6, 2014

(54) SYSTEM AND METHOD FOR PROVIDING COMBINATION PACKAGES

(75) Inventors: Ayon Sinha, Sunnyvale, CA (US); Shaocheng Gong, Shanghai (CN)

(73) Assignee: eBay Inc., San Jose, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 13/177,293

(22) Filed: Jul. 6, 2011

(65) Prior Publication Data
US 2013/0013449 A1    Jan. 10, 2013

(51) Int. Cl.
*G06Q 30/00* (2012.01)
(52) U.S. Cl.
USPC ............... 705/26.8; 705/26.44; 705/26.5
(58) Field of Classification Search
USPC ............................................. 705/26.1–27.2
See application file for complete search history.

(56) References Cited

U.S. PATENT DOCUMENTS

| | | | |
|---|---|---|---|
| 5,835,911 A | 11/1998 | Nakagawa et al. | |
| 6,167,383 A | 12/2000 | Henson | |
| 6,598,026 B1 | 7/2003 | Ojha et al. | |
| 7,571,106 B2 | 8/2009 | Cao et al. | |
| 7,617,128 B2 * | 11/2009 | Greak | 705/26.35 |
| 8,015,070 B2 * | 9/2011 | Sinha et al. | 705/26.1 |
| 2001/0032175 A1 | 10/2001 | Holden et al. | |
| 2001/0049647 A1 | 12/2001 | Sheehan | |
| 2002/0029183 A1 | 3/2002 | Vlahoplus et al. | |
| 2002/0077954 A1 | 6/2002 | Slaight et al. | |
| 2004/0054603 A1 | 3/2004 | Clinesmith et al. | |
| 2004/0205003 A1 | 10/2004 | Carpenter et al. | |
| 2006/0287924 A1 * | 12/2006 | Admon | 705/26 |
| 2008/0021794 A1 * | 1/2008 | Vega | 705/26 |
| 2008/0120174 A1 | 5/2008 | Li | |
| 2009/0138380 A1 * | 5/2009 | Roseman et al. | 705/27 |
| 2010/0287030 A1 | 11/2010 | Sinha et al. | |

OTHER PUBLICATIONS

"U.S. Appl. No. 12/346,476, Response Filed May 9, 2011 to Non-Final Office Action Received Feb. 10, 2011", 12 pgs.
"U.S. Appl. No. 12/436,476, Non Final Office Action mailed Feb. 10, 2011", 17 pgs.
"U.S. Appl. No. 12/436,476, Notice of Allowance mailed Jun. 17, 2011", 14 pgs.
"Phone TV Internet.com:Home page", [Online]. Retrieved from the Internet:<http://www.phonetvinternet.com>, 5 pgs.
Raposa, Jim, "OpenSite is high bidder on Web auctioning (Evaluation)", PC Week, (Mar. 22, 1999), 2 pgs.

* cited by examiner

*Primary Examiner* — William Allen
(74) *Attorney, Agent, or Firm* — Schwegman Lundberg & Woessner, P.A.

(57) ABSTRACT

In various exemplary embodiments, a system and method to provide customized combination packages is disclosed. The method includes receiving a selection of a plurality of items from a potential buyer, the selection of the plurality of items creating a customized combination package. Available transaction history for past transactions of similar items to the items of the customized combination package is provided to the potential buyer. An offer from the potential buyer is then received and provided to a seller selling the plurality of items for consideration.

19 Claims, 6 Drawing Sheets

SYSTEM AND METHOD FOR PROVIDING COMBINATION PACKAGES

RELATED APPLICATION

This application claims the priority benefit of U.S. patent application Ser. No. 12/436,476, filed May 6, 2009 and entitled "System and Method for Providing Combination Package Best Offers," which is incorporated herein by reference.

TECHNICAL FIELD

The present application relates generally to the field of computer technology and, in a specific exemplary embodiment, to a system and method of allowing customized combination packages in a network-based marketplace.

BACKGROUND

In a multi-seller network-based marketplace, a plurality of sellers can each list one or more items for sale. Buyers can then offer to purchase one or more of the items. When purchasing multiple items, the buyer may either agree to pay a fixed price on each individual item or provide an offer on each individual item and wait for an acceptance on each offer.

In some cases, the seller may combine items into packages for listing in the network-based marketplace. These packages may offer the items at a discount over purchasing the items individually. However, the packages are pre-determined and cannot be altered in any way (e.g., with one item within the package exchanged for a different item). Therefore, in order to satisfy buyers who may want different combinations of items, the seller needs to create a plurality of different individual and combination package listings on the network-based marketplace. Unfortunately, creating listings is time consuming, and each listing may be associated with a listing fee. Thus, more listings may require the seller to pay more listing fees.

BRIEF DESCRIPTION OF DRAWINGS

Various ones of the appended drawings merely illustrate exemplary embodiments of the present invention and cannot be considered as limiting its scope.

DETAILED DESCRIPTION

The description that follows includes illustrative systems, methods, techniques, instruction sequences, and computing machine program products that embody the present invention. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on a network-based marketplace environment, the embodiments are given merely for clarity in disclosure. Thus, any type of electronic commerce or electronic business system and method, including various system architectures, may employ various embodiments of the customized combination package best offer system and method described herein and is considered as being within a scope of exemplary embodiments. Each of a variety of exemplary embodiments is discussed in detail, below.

Exemplary embodiments provide a system and method for providing customized combination packages. Since sellers are more inclined to offer a larger discount if more items are purchased, exemplary embodiments allow a potential buyer to customize a package of multiple items from a seller in order to potentially increase a discount opportunity. Furthermore, exemplary embodiments allow a seller to reduce listing costs since combination packages containing different items at different prices no longer need to be listed separately.

Figure 1:
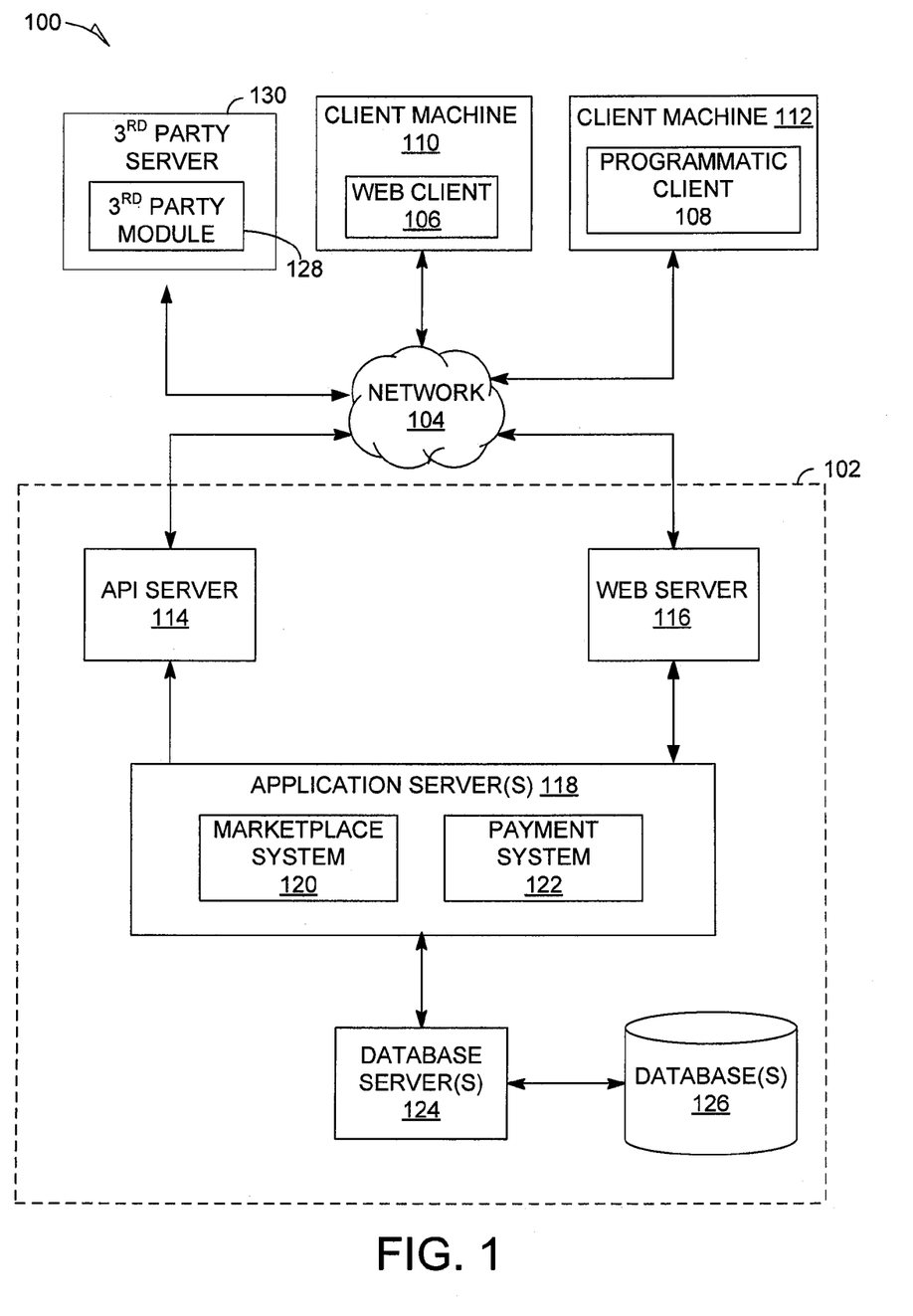
FIG. 1 is a block diagram illustrating an exemplary embodiment of a high-level, client-server-based network architecture of a system used to provide customized combination best offers.

With reference to FIG. 1, an exemplary embodiment of a high-level client-server-based network architecture 100 for providing customized combination based marketplace or publication system, provides best offers is shown. A networked system 102, in an exemplary form of a network-server-side functionality, via a network 104 (e.g., the Internet or Wide Area Network (WAN)) to one or more clients. FIG. 1 illustrates, for example, a web client 106 operating via a browser (e.g., such as the Internet Explorer® browser developed by Microsoft® Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host a marketplace system 120 and a payment system 122, which may comprise one or more modules, applications, or engines, each of which may be embodied as hardware, software, firmware, or any combination thereof. The application servers 118 are, in turn, coupled to one or more database servers 124 facilitating access to one or more information storage database(s) 126.

The marketplace system 120 provides a number of marketplace functions and services to users that access the networked system 102. The marketplace system 120 is discussed in more detail in connection with FIG. 2.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (i.e., goods or services) that are made available via the marketplace system 120. The payment system 122 also facilitates payments from a payment mechanism (e.g., a bank account or credit card) for purchases of items via the network-based marketplace. While the marketplace system 120 and the payment system 122 are shown in FIG. 1 to both form part of the networked system 102, it will be appreciated that, in alternative embodiments, the payment system 122 may form part of a payment service that is separate and distinct from the networked system 102.

FIG. 1 also illustrates a third party module 128, executing on a third party server 130, as having programmatic access through the network 104 to the networked system 102 via the programmatic interface provided by the API server 114. For example, the third party module 128 may, utilizing information retrieved from the networked system 102, support one or more features or functions on a website (not shown) hosted by the third party. The third party website may, for example, provide one or more promotional, marketplace, or payment functions that are supported by the relevant applications of the networked system 102.

While the exemplary architecture 100 of FIG. 1 employs a client-server architecture, a skilled artisan will recognize that the present disclosure is not limited to such an architecture. The exemplary architecture 100 could equally well find application in, for example, a distributed or peer-to-peer architecture system. The marketplace system 120 and payment system 122 may also be implemented as standalone software programs operating under separate hardware platforms, which do not necessarily have networking capabilities.

Figure 2:
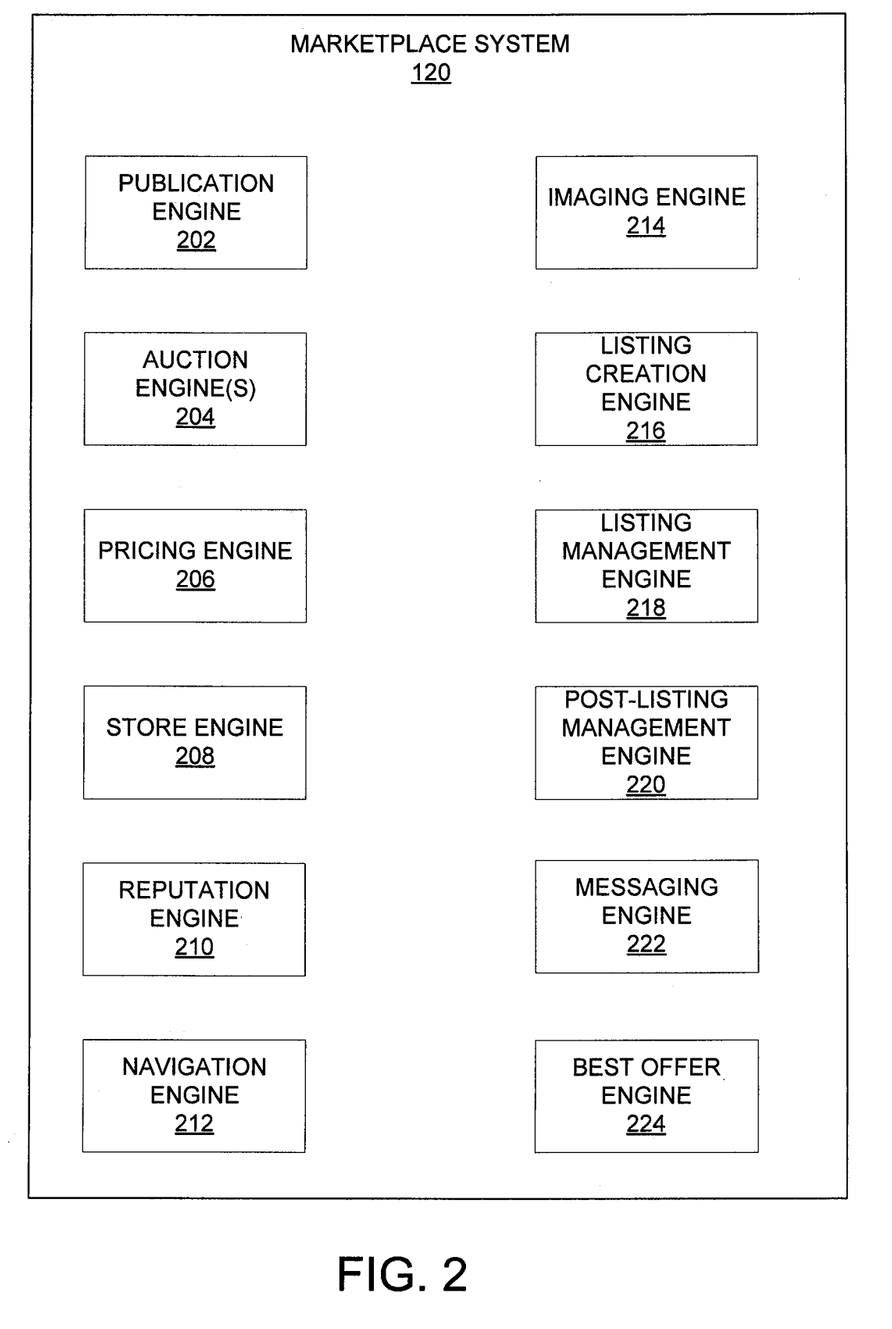
FIG. 2 is a block diagram illustrating an exemplary embodiment of a marketplace system of the network architecture of FIG. 1.

Referring now to FIG. 2, an exemplary block diagram illustrating multiple components that, in one exemplary embodiment, are provided within the marketplace system 120 of the networked system 102 (see FIG. 1) is shown.

The marketplace system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. The components may furthermore access the one or more database(s) 126 via the one or more database servers 124, both shown in FIG. 1.

The networked system 102 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace system 120 comprises at least one publication engine 202 and one or more auction engines 204 that support auction-format listing and price setting mechanisms (e.g., English, Dutch, Chinese, Double, Reverse auctions, Best Offer, etc.). The various auction engines 204 also provide a number of features in support of such auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing or a catalogue listing). Another format comprises a buyout-type listing. Buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

The pricing engine 206 further supports best offer listings. The best offer listing allows a buyer to propose a highest price the buyer is willing to pay for one or more items. Typically, the best offer listing may provide a starting price for an item set by the seller. The buyer may agree to pay the starting price or provide an offer for a price that is lower than the starting price. The best price offer is then provided to the seller for review. The seller may accept or refuse the best price offer.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as best offer items in the virtual store. A buyer may then select two or more of the best offer items to create a customized combination package, on which the buyer may make a best offer.

A reputation engine 210 allow users that transact, utilizing the networked system 102, to establish, build, and maintain reputations, which may be made available and published to potential trading partners. Because the networked system 102 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the networked system 102 over time. Other potential trading partners may then reference the reputation for purposes of assessing credibility and trustworthiness.

In certain exemplary embodiments, the reputation engine 210 receives and stores feedback on both sellers and buyers of the network-based marketplace. Feedback on a buyer may include a positive, negative, or neutral rating along with comments from sellers who have interacted with the buyer. Feedback on a seller may include a general positive, negative, or neutral rating along with comments from buyers who have interacted with the seller. Additionally, the buyers may provide detailed seller ratings (DSR) on the seller on various factors. The factors may include shipping time, item description, communication, and shipping charges. The DSR may be based on a scale (e.g., five point scale). The reputation engine 210 also maintains a record of number of transactions associated with each buyer and seller.

Navigation of the networked system 102 may be facilitated by a navigation engine 212. For example, a search module of the navigation engine 212 enables key word searches of listings published via the networked system 102. A browse module of the navigation engine 212 allows users to browse various category, catalogue, or inventory data structures according to which listings may be classified within the networked system 102. Various other navigation applications within the navigation engine 212 may be provided to supplement the searching and browsing applications.

In order to make listings available via the networked system 102 as visually informing and attractive as possible, the marketplace system 120 may include an imaging engine 214 that enables users to upload images for inclusion within listings. The imaging engine 214 also operates to incorporate images within viewed listings. The imaging engine 214 may also support one or more promotional features, such as image galleries that are presented to potential buyers. For example, sellers may pay an additional fee to have an image included within a gallery of images for promoted items.

A listing creation engine 216 allows sellers conveniently to author listings pertaining to goods or services that they wish to transact via the networked system 102, and a listing management engine 218 allows sellers to manage such listings. Specifically, where a particular seller has authored or published a large number of listings, the management of such listings may present a challenge. The listing management engine 218 provides a number of features (e.g., auto-relisting, inventory level monitors, etc.) to assist the seller in managing such listings.

A post-listing management engine 220 also assists sellers with a number of activities that typically occur post-listing. For example, upon completion of an auction facilitated by one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

A best offer engine 224 is provided to process customized combination package best offers. The best offer engine 224 is discussed in more detail in connection with FIG. 3.

Although the various components of the marketplace system 120 have been defined in terms of a variety of individual modules and engines, a skilled artisan will recognize that many of the items can be combined or organized in other ways. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
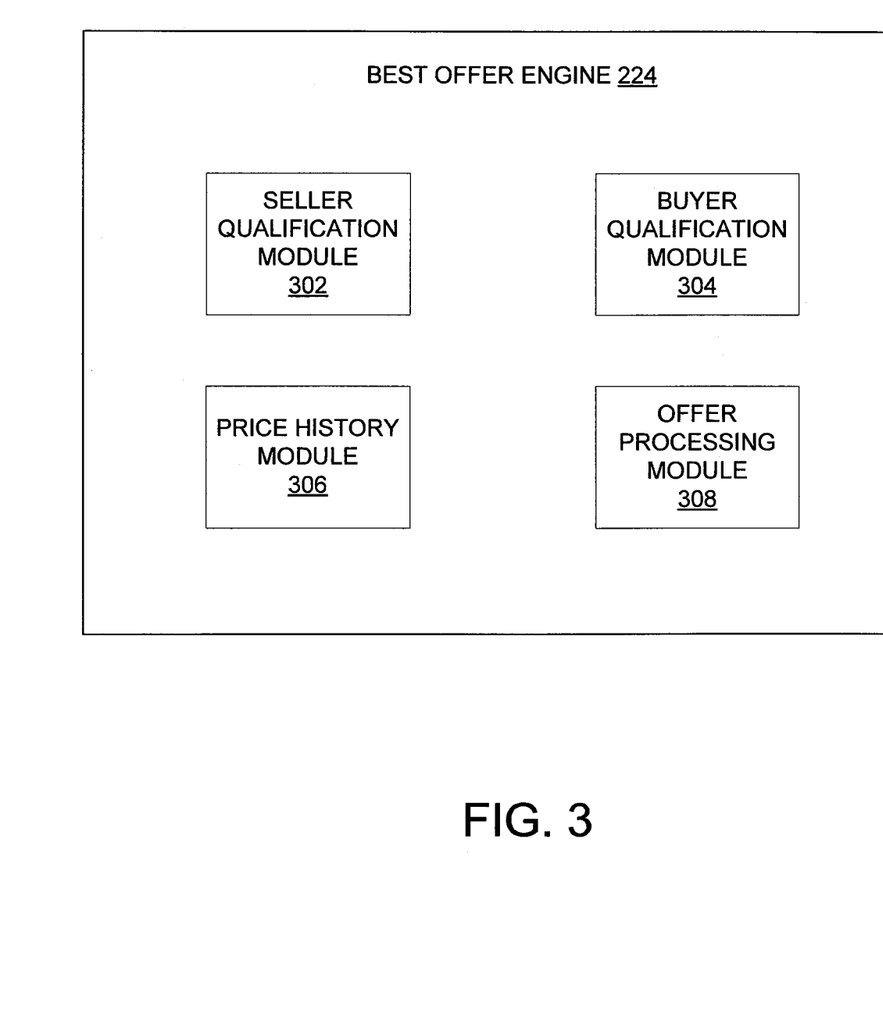
FIG. 3 is a block diagram illustrating an exemplary best offer engine.

Application of Embodiments of the Combination Package Best Offer Platform into the Exemplary Network Architecture Referring now to FIG. 3, a diagram of the exemplary best offer engine 224 is shown. The best offer engine 224 comprises a seller qualification module 302, a buyer qualification module 304, a price history module 306, and an offer processing module 308.

The seller qualification module 302 determines which sellers qualify to offer items for sale via customizable combination package best offers. In various embodiments, sellers having high feedback or detailed seller ratings (DSRs) are allowed to provide items available for a combination package best offer. For example, only sellers that have a 98% positive feedback or 4.9 DSR on a 5.0 scale are allowed to participate in combination package best offers. The seller qualification module 302 may review the feedback received via the reputation engine 210 upon a request by the seller to offer items for combination package best offers. Alternatively, the seller qualification module 302 may automatically review the feedback for each seller and notify eligible sellers that they are qualified to offer items for combination package best offers.

In a similar manner, the buyer qualification module 304 determines if a buyer qualifies to make a customized combination package best offer. In various embodiments, buyers meeting certain (buyer qualifying) criteria are allowed to make the combination package best offer. The criteria include, for example, having a particular positive feedback percentage (e.g., 98% or above), being linked to a payment account (e.g., a PayPal account), or having a minimum number of previous purchases. In some embodiments, the criteria are set by each seller for the seller's own items. In other embodiments, a general set of criteria is set by the network-based marketplace, which may be augmented by the individual seller criteria.

The price history module 306 determines a price history for a combination package within, for example, the past 15 or 30 days or a specified span of period. In exemplary embodiments, the price history module 306 accesses the one or more information database(s) 126 for stored previous sale information. The previous sale information may be stored by, or associated with, a seller identifier and an item identifier. The seller identifier indicates the seller or merchant, while the item identifier is a unique identifier associated with each item that a seller lists. By using these identifiers, the price history module 306 can determine a selling price (e.g., best offer selling price) of the same combination package or selling prices of each individual item in the combination package The offer processing module 308 functions with other components of the marketplace system 120 to process combination package best offer transactions. Initially, the offer processing module 308 works with the pricing engine 206, imaging engine 214, and listing creation engine 216 to establish the best offer items on the network-based marketplace. When a combination package best offer is made by a potential buyer, the offer processing module 308 works with the messaging engine 222 to notify the seller of the combination package best offer and to receive a response from the seller. A negative response is communicated to the potential buyer. A positive response will trigger a completed sale and payment process (e.g., processed by the payment system 122).

Furthermore, the offer processing module 308 may provide the seller with a purchase history of the potential buyer. For example, the offer processing module 308 can access the one or more database(s) 126 for information on previous purchases made by the same potential buyer based on a buyer identifier associated with the potential buyer. The purchase history includes an indication whether the seller has previously sold to the potential buyer and a number of purchases previously made by the potential buyer in the network-based marketplace. Additional information, including feedback associated with the potential buyer, is provided to the seller. Based on the information, the seller makes an informed decision on whether to accept a best offer from the potential buyer. In another exemplary embodiment (not shown directly), the best offer engine 224 includes only the buyer qualification module 304 and not the seller qualification module 302. In this embodiment, any seller can produce package offers for sale, but each buyer still should be qualified to bid on one or more packages.

Therefore, while various embodiments of the inventive subject matter are described with reference to assorted implementations and exploitations, it will be understood that these embodiments are illustrative only and that a scope of embodiments of the present invention is not limited merely to those described embodiments. Moreover, the adaptive systems and methods described herein may be implemented with facilities consistent with any hardware system or systems either defined herein or known independently in the art using techniques described herein. Many variations, modifications, additions, and improvements are therefore possible.

Figure 4:
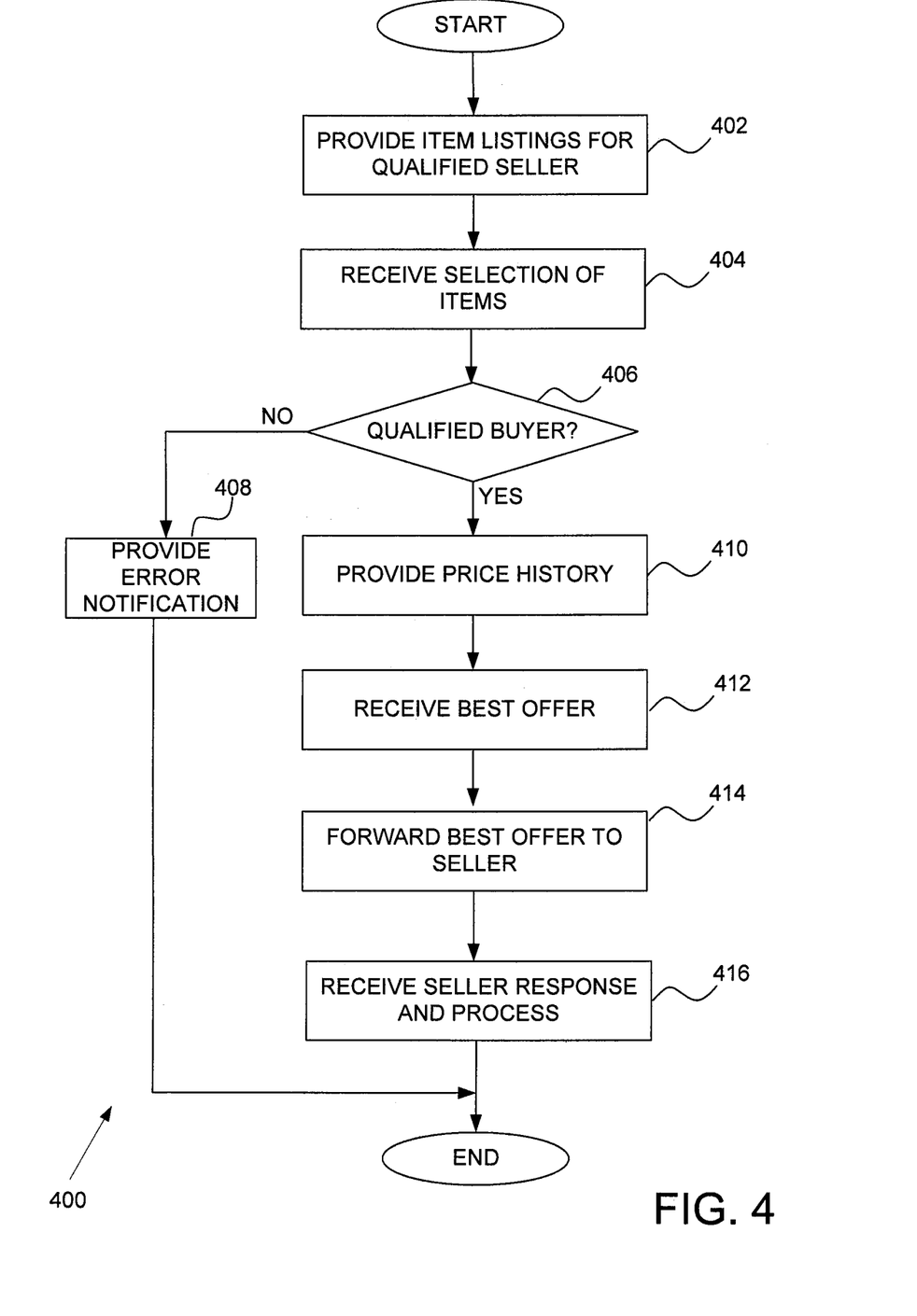
FIG. 4 is a flowchart illustrating an exemplary method for providing customized combination package best offers.

FIG. 4 is illustrates a flowchart of an exemplary method 400 for providing customized combination package best offers. In 402, item listings for qualified sellers are provided to a potential buyer. In various exemplary embodiments, the potential buyer searches for one or more particular items in the network-based marketplace. The search may direct the potential buyer to a virtual store of a particular seller which contains a plurality of items for sale (e.g., "Buy it Now" items, "Best Offer" items) as well as other auctions items. For example, the potential buyer may be interested in purchasing camera equipment. A search of the topic will lead the potential buyer to a virtual camera store (e.g., Bob's Camera Store) which lists a plurality of camera-related items for sale. A link to more detailed feedback on the seller may also be provided on a listing page or in an item listing. This link will provide the potential buyer with more information on the seller (e.g., feedback comments, whether discounts were previously provided or whether the seller has accepted best offers for the same or a similar combination package) and help the potential buyer evaluate the trustworthiness of the seller.

In 404, a selection of a plurality of items is received from the potential buyer. The selection results in a customized combination package. Continuing with the example, the potential buyer may select three items from Bob's Camera Store to create the customized combination package (e.g., a light kit, a video tripod, and a replacement camera battery).

A best offer engine determines whether the potential buyer is qualified to make the combination package best offer at operation 406. In exemplary embodiments, the buyer qualification module 304 determines if the buyer meets certain criteria to allow the potential buyer to make the combination package best offer. The criteria include, for example, having a particular positive feedback percentage (e.g., 98% or above), being linked to a payment account (e.g., a PayPal account), or having a minimum number of previous purchases.

In some embodiments, the buyer qualification module 304 performs a pre-condition check to determine if the buyer is qualified to make a combination package best offer. If the buyer is not qualified at the pre-condition level, he or she cannot select a plurality of items to make a combination package. That is, a determination is made whether the buyer is qualified (operation 406) prior to allowing the buyer to make the selection (operation 404).

In either case, if a determination is made that the potential buyer is not qualified, then at operation 408, the potential buyer is given an error notification. In one embodiment, the error notification is displayed as a message on a webpage that indicates that the potential buyer does not meet the requirements to make a best offer on a particular package.

If the potential buyer is qualified, then a price history is provided in 410. The price history provides guidance to the potential buyer in formulating a best price that the potential buyer is willing to pay for the combination package. The price history may be provided on a side of a webpage that allows the potential buyer to submit a best offer. It should be noted that in some embodiments, no price history may be available. The price history process is discussed in more detail in connection with FIG. 5 below.

Based on the price history, a best offer is received in 412. The best offer is a highest price the potential buyer is willing to pay for the combination package. In some embodiments, the potential buyer may be limited to a number of times that the potential buyer is allowed to make a best offer on a same combination package. This prevents the potential buyer from incrementally increasing a best offer on the same combination package until it is accepted. In some embodiments, the limitation may be applied to a combination package containing similar items. Additionally, in some embodiments, the potential buyer is limited to entering a best offer price to at most 20% below a recommended price, to reduce the number of "low-ball" offers that the seller may have to process. Furthermore, the buyer qualification module 304 may run a second time to determine if the particular package or best offer breaks any rules. For example, if the best offer price is 30% lower than the recommended price, the best offer price may be automatically rejected.

The best offer is forwarded to the seller for review in 414. The seller is provided additional information associated with the potential buyer in the review process. For example, a purchase history of the same potential buyer may be provided. Additional feedback associated with the potential buyer as well as links to the feedback may be provided as well. Based on all of this information, the seller may make an informed decision on whether to accept a best offer from the potential buyer. A response is provided to the buyer in 416. Notification as to acceptance or rejection of the best offer is then communicated to the potential buyer.

In some embodiments, a customized combination package with an accepted best offer may be listed as a new listing for sale by the seller. Creation of the new listing, including the combination package, may be desired if the same combination package has sold in the past, an indication that other potential buyers may be interested in the same items. As such, the listing creation engine 216 may create the new listing.

Figure 5:
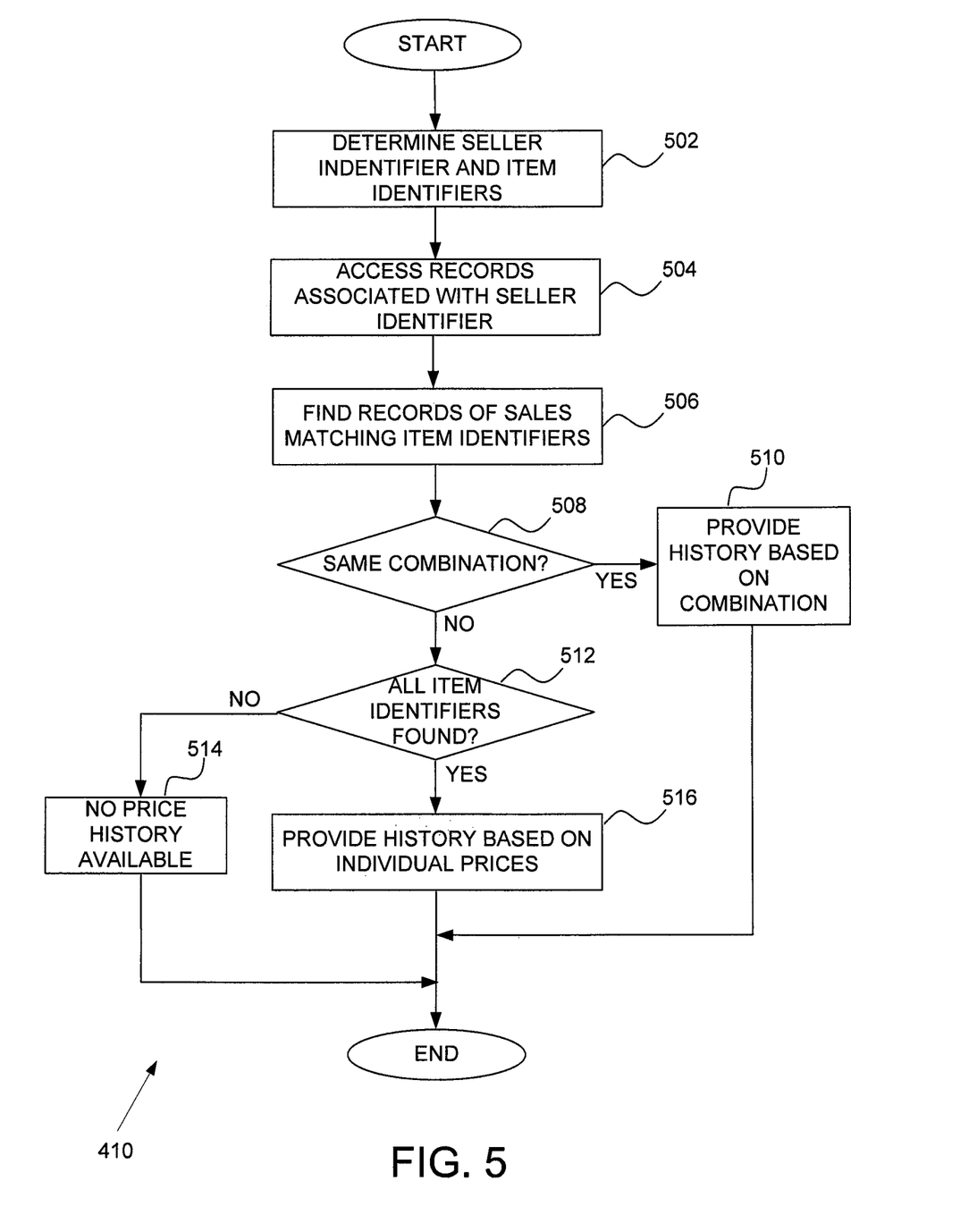
FIG. 5 is a flowchart illustrating an exemplary method for providing price history.

FIG. 5 is a flowchart of an exemplary method for providing the price history (operation 410) for a combination package. In 502, the seller identifier and item identifiers are determined. The seller identifier indicates the seller or merchant, while the item identifier is a unique identifier (e.g., a 12-digit number) associated with each item (or plurality of same items in a single listing) that a seller lists. The item identifier is generated and associated with an item when a listing for the item is created. In 504, records associated with the seller identifier are accessed. In exemplary embodiments, a price history module accesses an information database for stored previous sale information. The previous sale information may be stored by, or associated with, the seller identifier.

Records of sales of items having the same item identifier are found in 506. As discussed, the item identifier is generated and associated with an item when a listing for the item is created. If multiple items are available within the same listing (e.g., a listing with 5 quantities of the item available), the items will have the same item identifier. Thus, when combination package best offers are made, the sale of items having the same item identifier as those within the combination package may readily be determined.

In 508, a determination is made as to whether a same combination package has been previously sold by the seller. By using the item identifier, the price history module may search for the same combination package of items. If the same combination package is found, then the price history is given for the same combination package in 510. The price history may comprise an average price, a lowest price, a highest price, a range of prices, or any combination of these if more than one identical combination package has sold.

If an identical combination is not found, a determination is made in 512 as to whether all item identifiers of items in the combination package are separately found or found in a smaller combination package. Continuing with the camera example, a combination package with only the lighting kit and the replacement camera battery may have previously sold. Additionally, the video tripod may also have a past best-offer sale. Alternatively, all three camera items may have had one or more individual past best-offer sale. In the example, the individual costs of the lighting kit (e.g., $176.00), video tripod (e.g., $148.00), and replacement camera battery (e.g., $69.99) may be $393.99. However, the seller may accept a lower price (e.g., $350) and provide a lower shipping cost (e.g., due to less shipping overhead).

If not all item identifiers are found in 512, then either an incomplete or no price history is available in 514. The potential buyer may, in this case, be provided with no price history. Alternatively, the potential buyer may be provided with a summation of the current offer prices for the selected items (e.g., the summation of the base starting price offered by the seller).

If all item identifiers are found in 512, then the price history based on the individual prices or smaller combination packages is provided in 516. Thus, the price history module may sum the individual best offer selling prices of the items or smaller combinations of the items. The price history may comprise an average price, a lowest price, a highest price, a range of prices, or any combination of these.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to. constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 6:
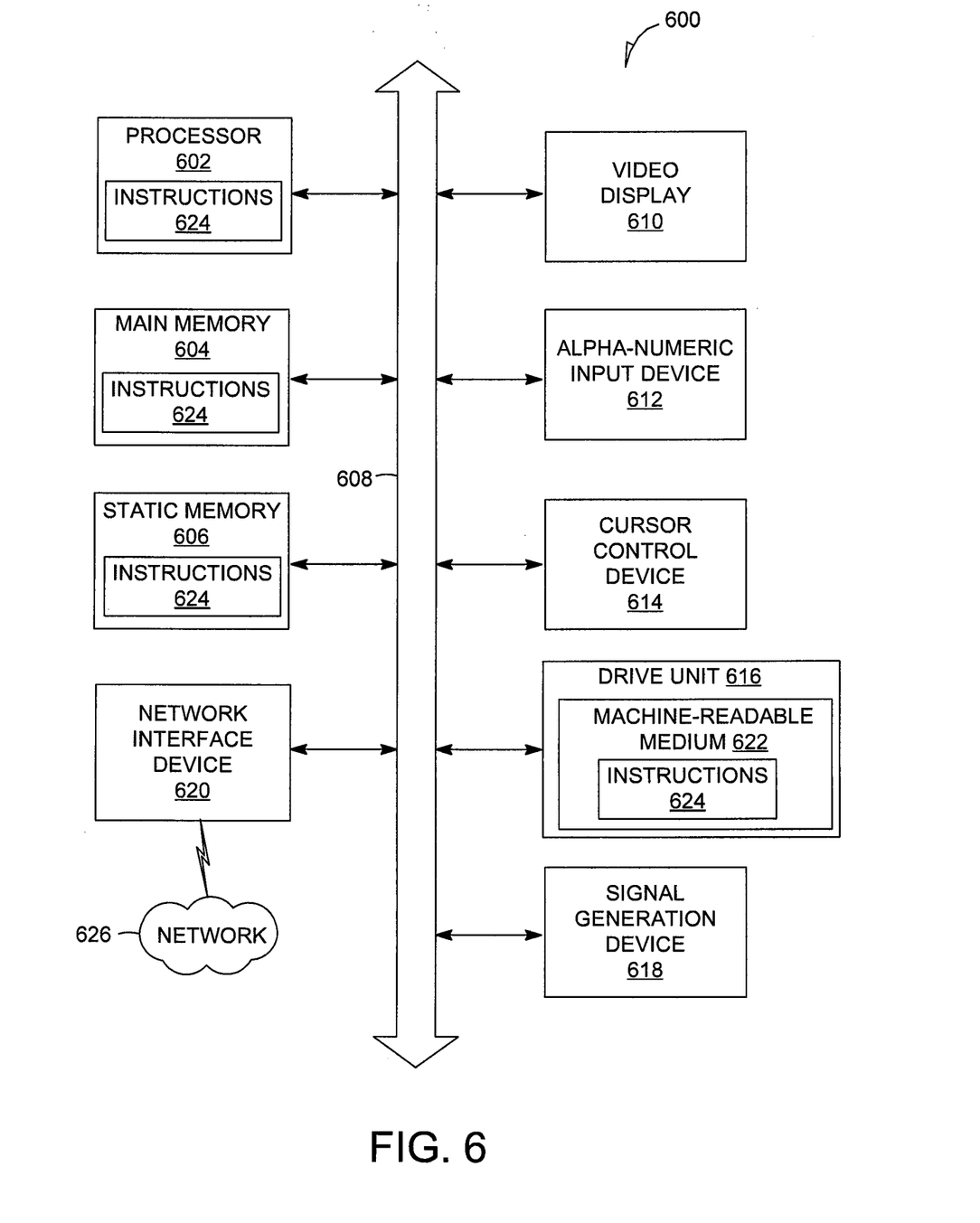
FIG. 6 is a simplified block diagram of a machine in an exemplary form of a computing system within which a set of instructions for causing the machine to perform any one or more of the methodologies discussed herein may be executed.

With reference to FIG. 6, an exemplary embodiment extends to a machine in the exemplary form of a computer system 600 within which instructions for causing the machine to perform any one or more of the methodologies discussed herein may be executed. In alternative exemplary embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In exemplary embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

Machine-Readable Medium

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, from a potential buyer, a selection of a plurality of items offered for sale by a single seller, the selection of the plurality of items creating a customized combination package, the creating the customized combination package performed by a hardware processor;
   providing a transaction history for past transactions of similar items to the items of the customized combination package to the potential buyer;
   receiving an offer for the customized combination package from the potential buyer; and
   providing the offer to the single seller selling the plurality of items for consideration.

2. The method of claim 1, further comprising:
   determining whether the potential buyer is a qualified buyer allowed to make the offer for the customized combination package; and
   preventing the potential buyer from making the offer based on the potential buyer not being a qualified buyer.

3. The method of claim 1, further comprising providing a transaction history for the potential buyer to the single seller.

4. The method of claim 1, further comprising providing identity and feedback information of the single seller to the potential buyer.

5. The method of claim 1, wherein the providing of the transaction history comprises providing a price history associated with the similar items.

6. The method of claim 1, wherein the providing of the transaction history comprises:
   determining whether a further combination package of similar items identical to the customized combination package has been previously sold by the single seller;
   based on the further combination package having been previously sold by the single seller, providing a transaction history for the further combination package to the potential buyer;
   based on the determination that no further combination package of similar items identical to the customized combination package has been previously sold, determining if a smaller combination package comprising less similar items than all of the items in the customized combination package has been previously sold by the single seller; and
   based on the smaller combination having been previously sold by the single seller, providing a transaction history for the smaller combination to the potential buyer.

7. The method of claim 1, further comprising creating a listing for a combination package identical to the customized combination package based on the single seller accepting the offer for the customized combination package.

8. A system comprising:
   at least one processor;
   an offer processing module, implemented by the at least one processor, to receive, from the potential buyer, a selection of a plurality of items offered for sale by a single seller, the selection of the plurality of items creating a customized combination package, the offer processing module further to receive an offer for the customized combination package from the potential buyer, and to provide the offer to the single seller selling the plurality of items for consideration; and a history module to provide a transaction history for past transactions of similar items to the items of the customized combination package to the potential buyer.

9. The system of claim 8, further comprising a buyer qualification module to determine whether the potential buyer is a qualified buyer allowed to make the offer for the customized combination package, and to prevent the potential buyer from making the offer based on the potential buyer not being a qualified buyer.

10. The system of claim 8, further comprising a seller qualification module to prescreen the single seller prior to allowing the single seller to offer items for selection in generating the customized combination package.

11. The system of claim 8, further comprising a reputation engine to manage feedback data associated with the potential buyer and the single seller.

12. The system of claim 8, wherein the history module is further to provide a price history associated with the similar items.

13. A non-transitory machine-readable storage medium in communication with at least one processor, the machine-readable storage medium storing instructions which, when executed by the at least one processor, causes a machine to perform operations comprising:

receiving, from a potential buyer, a selection of a plurality of items offered for sale by a single seller, the selection of the plurality of items creating a customized combination package;

providing a transaction history for past transactions of similar items to the items of the customized combination package to the potential buyer;

receiving an offer for the customized combination package from the potential buyer; and providing the offer to the single seller selling the plurality of items for consideration.

14. The non-transitory machine-readable storage medium of claim 13, wherein the operations further comprise:

determining whether the potential buyer is a qualified buyer allowed to make the offer for the customized combination package; and preventing the potential buyer from making the offer based on the potential buyer not being a qualified buyer.

15. The non-transitory machine-readable storage medium of claim 13, wherein the providing of the transaction history comprises providing a price history associated with the similar items.

16. The non-transitory machine-readable storage medium of claim 13, wherein the providing of the price history comprises:

determining whether a further combination package of similar items identical to the customized combination package has been previously sold by the single seller;

based on the further combination package having been previously sold by the single seller, providing a transaction history for the further combination package to the potential buyer;

based on the determination that no further combination package identical to the customized combination package has been previously sold, determining if a smaller combination comprising less similar items than all of the items in the customized combination package has been previously sold by the single seller; and based on the smaller combination having been previously sold by the single seller, providing a transaction history for the smaller combination to the potential buyer.

17. The non-transitory machine-readable storage medium of claim 13, wherein the operations further comprise creating a listing for a combination package identical to the customized combination package based on the single seller accepting the offer for the customized combination package.

18. The non-transitory machine-readable storage medium of claim 13, wherein the operations further comprise limiting a number of times the potential buyer may make an offer on the customized combination package.

19. The non-transitory machine-readable storage medium of claim 13, wherein the operations further comprises preventing the potential buyer from submitting an offer that is less than a predetermined amount of a recommended price.

* * * * *